US 6,680,977 B2

United States Patent
Collins et al.

(10) Patent No.: US 6,680,977 B2
(45) Date of Patent: Jan. 20, 2004

(54) METHOD AND APPARATUS FOR TRANSMITTING ANALOG AND DIGITAL INFORMATION SIGNALS

(75) Inventors: Fredrick P. Collins, Edgartown, MA (US); Michael C. Payne, North Andover, MA (US); Bruce A. Sokolik, Bedford, MA (US)

(73) Assignee: Microwave Radio Communications, North Billerica, MA (US)

( * ) Notice: Subject to any disclaimer, the term of this patent is extended or adjusted under 35 U.S.C. 154(b) by 0 days.

(21) Appl. No.: 10/081,914

(22) Filed: Feb. 22, 2002

(65) Prior Publication Data

US 2002/0168005 A1 Nov. 14, 2002

Related U.S. Application Data

(63) Continuation of application No. 09/126,946, filed on Jul. 31, 1998, now Pat. No. 6,377,314.

(51) Int. Cl.[7] .................................................. H04N 7/18
(52) U.S. Cl. .................... 375/240.26; 348/723; 348/725
(58) Field of Search ....................... 375/240.25–240.29; 348/720–730

(56) References Cited

U.S. PATENT DOCUMENTS

| 5,214,501 | A | * | 5/1993 | Cavallerano et al. | ....... 348/488 |
| 5,394,559 | A | | 2/1995 | Hemmie et al. | |
| 5,532,748 | A | | 7/1996 | Naimpally | |
| 5,786,870 | A | * | 7/1998 | Limberg | ........ 348/607 |
| 5,949,793 | A | | 9/1999 | Bossard et al. | |
| 6,184,921 | B1 | * | 2/2001 | Limberg | ........ 348/21 |
| 6,307,598 | B1 | * | 10/2001 | Limberg | ........ 348/729 |
| 6,377,314 | B1 | | 4/2002 | Collins | |
| 6,433,835 | B1 | * | 8/2002 | Hartson et al. | ........ 348/608 |

OTHER PUBLICATIONS

"Simultaneous Transmission of Digital Phase–Shift Keying and of Analog Television Signals," K. Feher and M. Morris, *IEEE Transactions on Communications*, pp. 1509–1514, Dec., 1975.

(List continued on next page.)

*Primary Examiner*—Andy Rao
(74) *Attorney, Agent, or Firm*—Reed Smith LLP

(57) ABSTRACT

A system for providing a common transport signal comprising an analog information signal and a digital information signal including a transmitter and a receiver for the common transport signal is disclosed. The transmitter includes an analog information signal modulator, placing the analog information signal onto a first intermediate frequency, a digital information signal modulator, placing a digital information signal onto a second intermediate frequency, a first upconverter and amplifier for upconverting the analog information signal, and a second upconverter for upconverting a frequency translated digital information signal. The system includes a power combiner for adding the upconverted analog and digital information signal to form a common transport signal. The receiver includes a signal receptor and conditioner, a signal splitter and dual signal recovery chains; each chain including at least a downconverter, a bandpass filter and intermediate frequency amplifier, and a signal demodulator.

10 Claims, 12 Drawing Sheets

OTHER PUBLICATIONS

"Shared Use of a Satellite Transponder by Analog and Digital Carriers," S.M. Hower, *Broadcasting Convention*, 1995 IBC 95, International, pp. 559–563, 1995.

"Digital Modulation/Demodulation Equipment for the Intelsat Intermediate Data Rate (IDR) Service," P.F. Robinson, *International Journal of Satellite Communications*, vol. 6, No. 4, 467–473 (Oct./Dec., 1988).

*Communication Receivers*, Ulrich L. Rohde, et al., McGraw Hill Publication, Second Edition, pp. 562–563, Fig. 9.24, 1997.

"Doubling Transponder Channel Capacity Economically," Joe St. Jean, *Broadcasting & Cable's Digital Television*, Feb. 1998.

"A Tale of Two Signals/On a single transponder the digital lion lies down with the analog lamb," Vincent H. Roberts, *Satellite Communications*, Feb., 1998.

PBS Memorandum entitled: Shared Operation of Digital and Analog Service (with attachments), Wilbert W. Hull, Aug. 19, 2002.

* cited by examiner

METHOD AND APPARATUS FOR TRANSMITTING ANALOG AND DIGITAL INFORMATION SIGNALS

CROSS REFERENCE TO RELATED APPLICATIONS

This application is a continuation of U.S. patent application Ser. No. 09/126,946 entitled "Methods and Apparatus for Transmitting analog and Digital Information Signals" filed Jul. 31, 1998 now U.S. Pat. No. 6,377,314, the entire disclosure of which is hereby incorporated by reference herein.

BACKGROUND OF THE INVENTION

1. Field of the Invention

The present invention relates to methods and apparatus for transmitting analog and digital information signals within a particular frequency bandwidth.

2. Description of the Background

Television broadcasters transmit standard analog television signals over channels regulated by the Federal Communications Commission (FCC). These signals conform to the requirements of the National Television Standards Committee (NTSC), administered by the FCC, and the signals are thus referred to as NTSC analog television signals. The current NTSC standard requires transmission of 525 lines of resolution transmitted as 30 interlaced frames per second (60 half frames per second). The FCC permits transmission of NTSC analog television signals over channels having a 25 megahertz bandwidth, an industry standard.

Recently, broadcasters have had a need to transmit digital television signals with the advent of high definition television (HDTV) and standard definition television (SDTV). These digital television signals are known as HDTV signals and SDTV signals, both of which conform to known industry standards. Obtaining additional bandwidth to transmit digital television signals can be difficult. Expanding a standard 25 megahertz channel is not be possible, at least since another channel likely exists adjacent the channel, and expansion of one channel would cause interference with another. Also, due to a limited number of channels available in the radio frequency (RF) spectrum used for transmission of television signals, broadcasters may have difficulty obtaining additional channels.

Therefore, a technique has been developed to transmit both analog and digital television signals within a standard 25 megahertz channel. This technology involves digitizing an NTSC analog television signal, combining it with an HDTV signal, and transmitting both as one digital signal centered on a carrier signal. However, digitizing an NTSC analog television signal often adversely affects its picture quality, resulting in what are referred to as "artifacts" in the picture. In addition, digitizing NTSC analog television signals tends to adversely affect picture quality in panning, involving moving the camera at least horizontally to record an event such as often occurs in recording sporting events.

Furthermore NTSC analog television signals have precise timing requirements that can be difficult to maintain when digitizing the signals. The timing requirements avoid, for example, delays or overlap between program broadcasts, commercials, and a broadcaster's identifying logo, all of which may arrive from different sources and thus must be precisely timed to generate a continuous uninterrupted picture. As a result, the technology required to digitize NTSC analog signals and combine them with HDTV signals can require a significant amount of processing capability and expensive components.

Accordingly, a need exists for transmitting analog television or information signals with digital television or information signals in the same bandwidth without significantly affecting the picture quality of the analog television signals.

SUMMARY OF THE INVENTION

A first method consistent with the present invention transmits combined analog and digital information signals. The method includes receiving an analog information signal and a digital information signal. The analog and digital information signals are combined for transmission within a particular frequency bandwidth while maintaining the analog information signal in analog form.

A second method consistent with the present invention transmits combined analog and digital information signals. The method includes receiving an analog information signal and a digital information signal. The analog and digital information signals are combined for transmission within a particular frequency bandwidth using a first carrier signal for the analog information signal and using a second carrier signal for the digital information signal.

A third method consistent with the present invention receives combined analog and digital information signals. The method includes receiving a signal, transmitted within a particular frequency bandwidth, having a first portion including an analog information signal maintained in analog form and having a second portion including a digital information signal. The analog information signal is separated from the digital information signal.

A fourth method consistent with the present invention receives combined analog and digital information signals. The method includes receiving a signal, transmitted within a particular frequency bandwidth, having a first portion including an analog information signal transmitted using a first carrier signal and having a second portion including a digital information signal transmitted using a second carrier signal. The analog information signal is separated from the digital information signal.

A first apparatus consistent with the present invention transmits combined analog and digital information signals. A first terminal receives an analog information signal, and a second terminal receives a digital information signal. A transmitter, coupled to the first and second terminals combines the analog information signal and the digital information signal for transmission within a particular frequency bandwidth while maintaining the analog information signal in analog form.

A second apparatus consistent with the present invention receives a combined analog and digital information signal. A terminal receives a signal, transmitted within an particular frequency bandwidth, having a first portion including an analog information signal maintained in analog form and having a second portion including a digital information signal. A receiver, coupled to the terminal, separates the analog information signal from the digital information signal.

A third apparatus consistent with the present invention transmits combined analog and digital information signals. A first terminal receives an analog information signal, and a second terminal receives a digital information signal. A transmitter, coupled to the first and second terminals, combines the analog information signal and the digital information signal for transmission within a particular frequency bandwidth using a first carrier signal for the analog information signal and using a second carrier signal for the digital information signal.

A fourth apparatus consistent with the present invention receives combined analog and digital information signals. A terminal receives a signal, transmitted within a particular frequency bandwidth, having a first portion including an analog information signal transmitted using a first carrier signal and having a second portion including a digital information signal transmitted using a second carrier signal. A receiver, coupled to the terminal, separates the analog information signal from the digital information signal.

Another system for providing a common transport signal comprising an analog information signal and a digital information signal, the system also including a transmitter for the common transport signal. The transmitter includes an analog information signal modulator, placing the analog information signal onto a first intermediate frequency, a digital information signal modulator, placing a digital information signal onto a second intermediate frequency, a first upconverter and amplifier for upconverting the analog information signal, and a second upconverter for upconverting a frequency translated digital information signal. The system also includes a power combiner for adding the upconverted analog information and the upconverted digital information signal to form a common transport signal.

The system also provides a means for reception of the common transport signal. The receiver includes a signal receptor and conditioner, a signal splitter and dual signal recovery chains; each chain including at least a downconverter, a bandpass filter and intermediate frequency amplifier, and a signal demodulator.

Another method of transmitting combined analog and digital information signals, includes receiving an analog information signal receiving a digital information signal shifting the frequency spectrum of the analog information signal a first amount, shifting the frequency spectrum of the digital information signal a second amount, and combining the frequency shifted analog information signal and the frequency shifted digital information signal for transmission within a standard television channel bandwidth such that the analog information signal is maintained in analog form during the combining step.

Another method of receiving a combined analog and digital information signal, the method including receiving a combined analog and digital information signal, splitting the combined signal to produce two such combined signals, downconverting the analog information signal by a first amount, downconverting the digital information signal by a second amount, frequency translating the frequency shifted digital information signal, and demodulating the analog information signal and the digital information signal.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Overview

Figure 1:
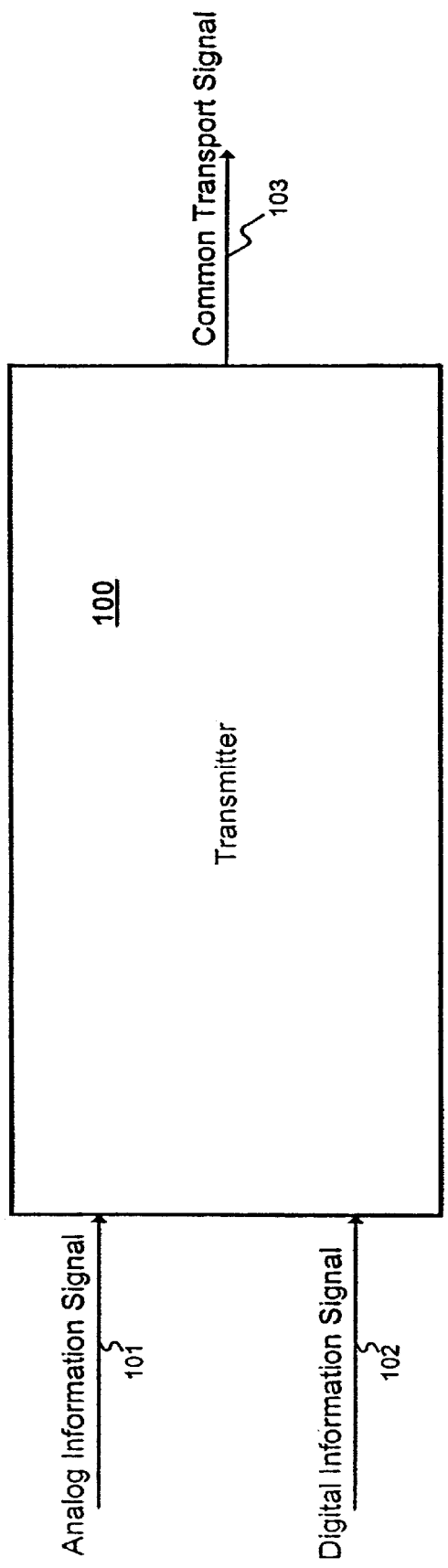
FIG. 1 is a diagram of a transmitter for transmitting analog and digital information signals consistent with the present invention.

FIG. 1 is a diagram of a transmitter 100 for transmitting analog and digital information signals consistent with the present invention. Transmitter 100 receives on terminal 101 one or more analog information signals, receives on terminal 102 one or more digital information signals, and converts them to a composite transport signal on terminal 103 for transmission, typically as an RF signal. Transmitter 100 provides an advantage of maintaining analog information signals in analog form, thus avoiding, for example, digitizing the signals in order to transmit them with the digital information signals. In addition, transmitter 100 typically uses two carrier signals, one for the analog information signal and another for the digital information signal.

Transmitter 100 transmits common transport signal on terminal 103 within a particular frequency bandwidth. For example, it may transmit the common transport signal within a standard channel bandwidth for transmission of television signals, currently 25 megahertz. Therefore, transmitter 100 permits broadcasters to transmit digital information signals, such as HDTV, SDTV, or data, in addition to analog television signals, meaning that the broadcaster may include additional signals without requiring additional channels or expansion of a current channel.

Figure 2:
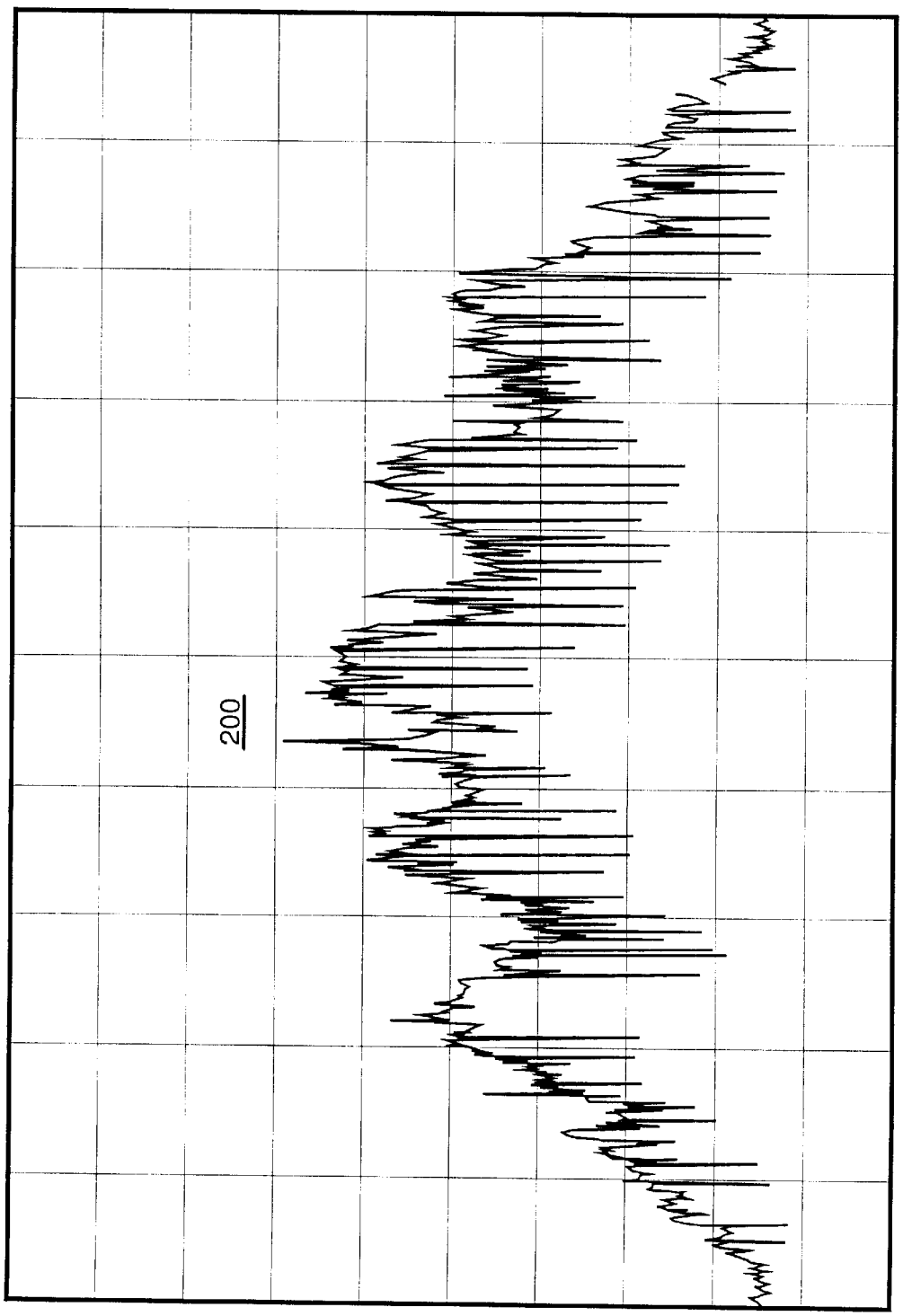
FIG. 2 is a frequency spectrum diagram of an exemplary analog information signal.

FIG. 2 is a frequency spectrum diagram of an exemplary analog information signal 200 received on terminal 101. In the grid shown in FIG. 2, each box represents 2.5 megahertz along the x-axis and 10 dB of amplitude along the y-axis. In this example, signal 200 includes an NTSC analog television signal spanning a 25 megahertz bandwidth and shown in baseband. NTSC analog television signals refer to analog television signals formatted consistent with current requirements of the NTSC. The phrase "analog information signal" refers to an electromagnetic signal transmitting information in analog form. Examples of analog information signals include, but are not limited to, to the following: analog television signals, NTSC analog television signals, analog audio signals, analog video signals, and analog video plus audio signals.

Figure 3:
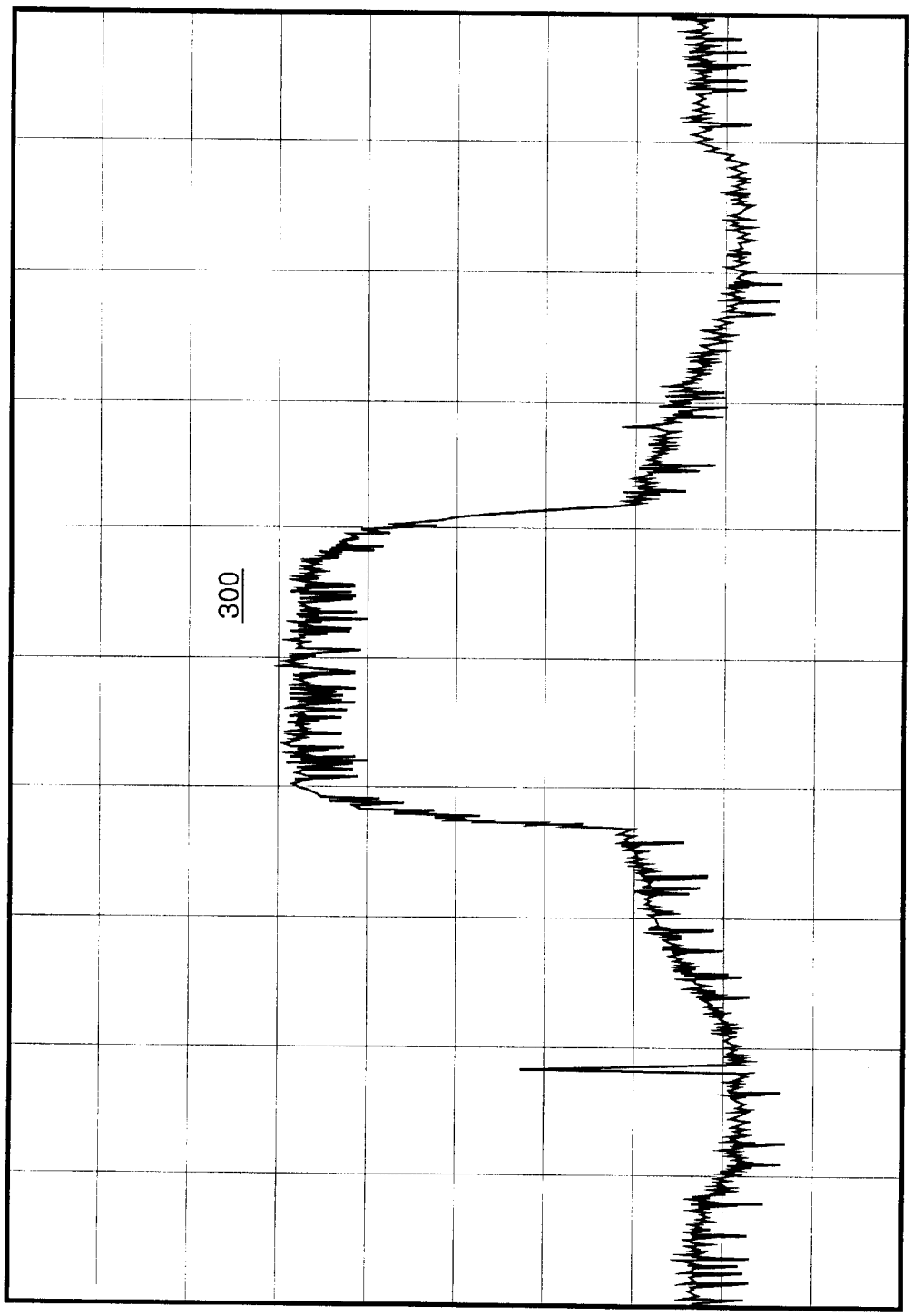
FIG. 3 is a frequency spectrum diagram of an exemplary digital information signal.

FIG. 3 is a frequency spectrum diagram of an exemplary digital information signal. In the grid shown in FIG. 3, each box represents 2.5 megahertz along the x-axis and 10 dB of amplitude along the y-axis. In this example signal 300 includes an HDTV signal spanning a 25 megahertz frequency bandwidth. Signal 300 may be provided from an industry standard 20 megabits/second modem, compressed from a direct data stream output of an HDTV camera. HDTV signals refer to digital television signals formatted consistent with current requirements of the Advanced Television Standards Committee (ATSC). The phrase "digital information signal" refers to an electromagnetic signal transmitting information in digital form. Examples of digital information signals include, but are not limited to, the following: HDTV signals, SDTV signals, digital data signals, and signals transmitted on T1 lines.

Figure 4:
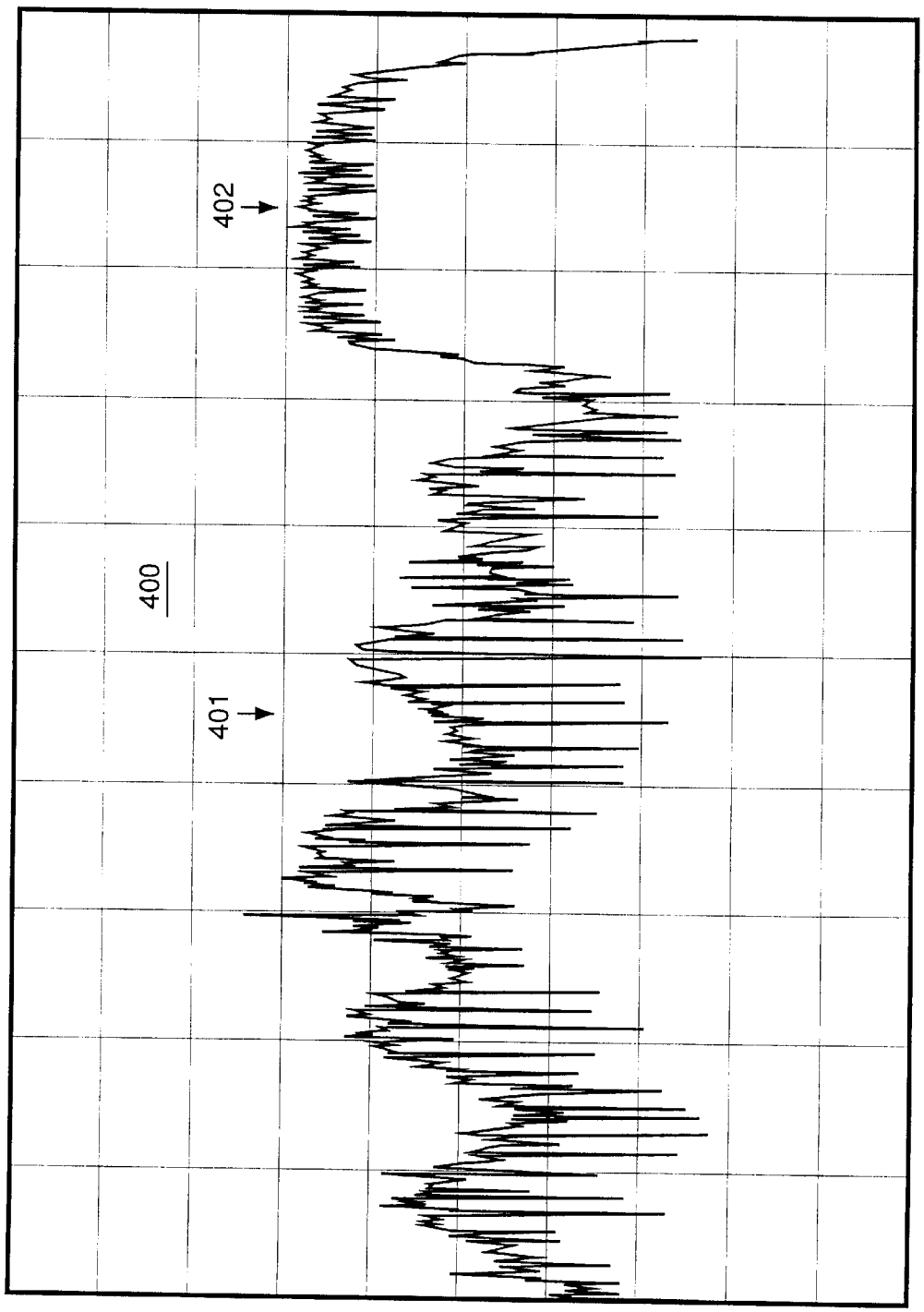
FIG. 4 is a frequency spectrum diagram of an exemplary common transport signal including analog and digital information signals.

FIG. 4 is a frequency spectrum diagram of an exemplary common transport signal 400 including analog and digital information signals transmitted on terminal 103. In the grid shown in FIG. 4, each box represents 2.5 megahertz along the x-axis and 10 dB of amplitude along the y-axis. Signal 400 is shown spanning a 25 megahertz bandwidth, providing an advantage of using the same channel bandwidth as the analog and digital information signals; alternatively, it may span a different channel bandwidth. Signal 400 includes a first portion 401 corresponding to analog information signal 200 and a second portion 402 corresponding to digital information signal 300. In order to fit both the analog and digital information signals in the same channel bandwidth in this example, analog information signal 200 is bandpass filtered in order to band limit portions of the ends of its frequency spectrum and produce signal 401. An NTSC analog television signal typically does not occupy the entire 25 megahertz channel bandwidth and therefore portions of the ends of the signal may be limited without sacrificing picture quality, permitting the NTSC analog television signal and digital information signal to both fit with the same standard television signal bandwidth. Alternatively, different channel bandwidths and types of analog and digital information signals (potentially occupying different bandwidths) may be transmitted using transmitter 100. Although transmitter 100 typically transmits common transport signal 400 as an RF signal, it may alternatively transmit it within a different portion of the frequency spectrum.

Figure 5:
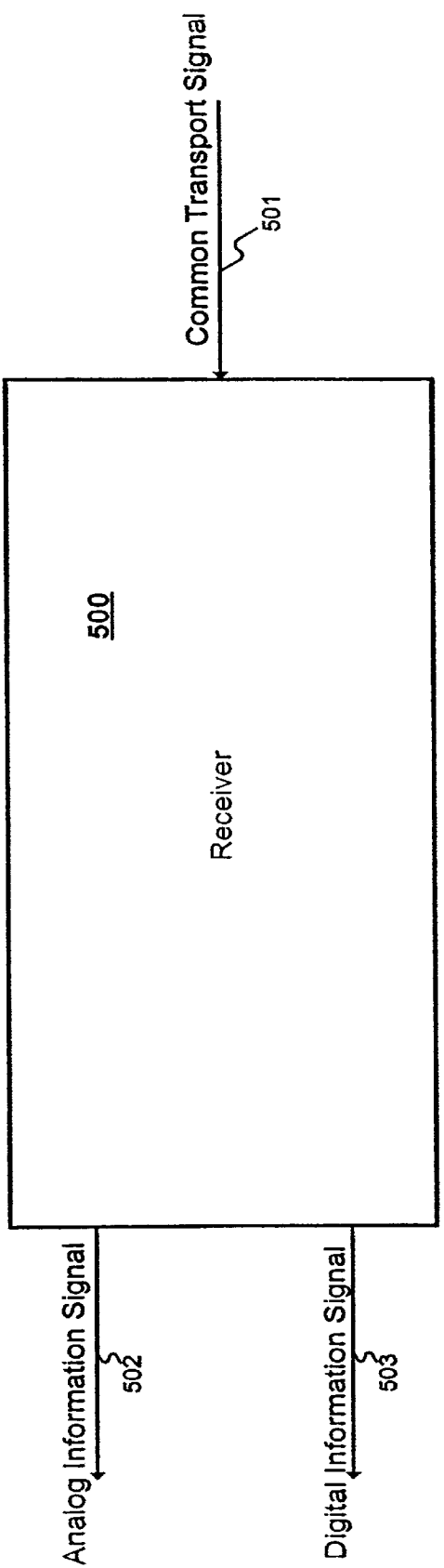
FIG. 5 is a diagram of a receiver for receiving a common transport signal including analog and digital information signals.

FIG. 5 is a diagram of a receiver 500 for receiving a common transport signal including analog and digital information signals. Receiver 500 receives a common transport signal on terminal 501 and separates the analog and digital information signals, outputting one or more analog information signals on terminal 502 and one or more digital information signals on terminal 503. The common transport signal received on terminal 501 may correspond t, for example, signal 400 shown in FIG. 4, and the analog and digital information signals output on terminals 502 and 503 may correspond, respectively, to NTSC analog television signal 200 shown in FIG. 2 and to HDTV signal 300 shown in FIG. 3. Receiver 500 may alternatively receive common transport signals having different types of analog and digital information signals and potentially occupying different bandwidths, and it may separate and output those signals. Also, although receiver 500 typically receives a common transport signal as an RF signal, it may alternatively receive the common transport from a different portion of the frequency spectrum.

Accordingly, transmitter 100 and receiver 500 permit broadcasters, for example, to transmit analog television signals with digital information signals in a standard channel. Broadcasters may use transmitter 100 in a studio-to-transmitter link (STL). STLs are used to transmit television or other information signals from a broadcast studio to a television transmit site, which in turn transmits the signals for reception by consumers' televisions. The analog television signals may be generated in the studio or transmitted from a broadcast vehicle to the studio.

Broadcasters may use receiver 500 on the transmitter side of an STL located at or proximate the television transmit site. In that situation, receiver 500 receives a common transport signal, and it separates the analog and digital information signals for transmission to consumers' televisions. The analog and digital information signals typically require different transmitters for transmission to consumers' television, in which case separating of the signals is necessary. In addition receiver 500 may also transmit the separated analog and digital information signals back to the studio from which the corresponding common transport signal was received. That communication is referred to as a transmitter-to-studio link (TSL). Transmitting the signals in a TSL provides a broadcaster with the signals it transmitted to the antenna and thus permits a broadcaster to receive feedback concerning the transmitted signals.

Transmitter

Figure 6:
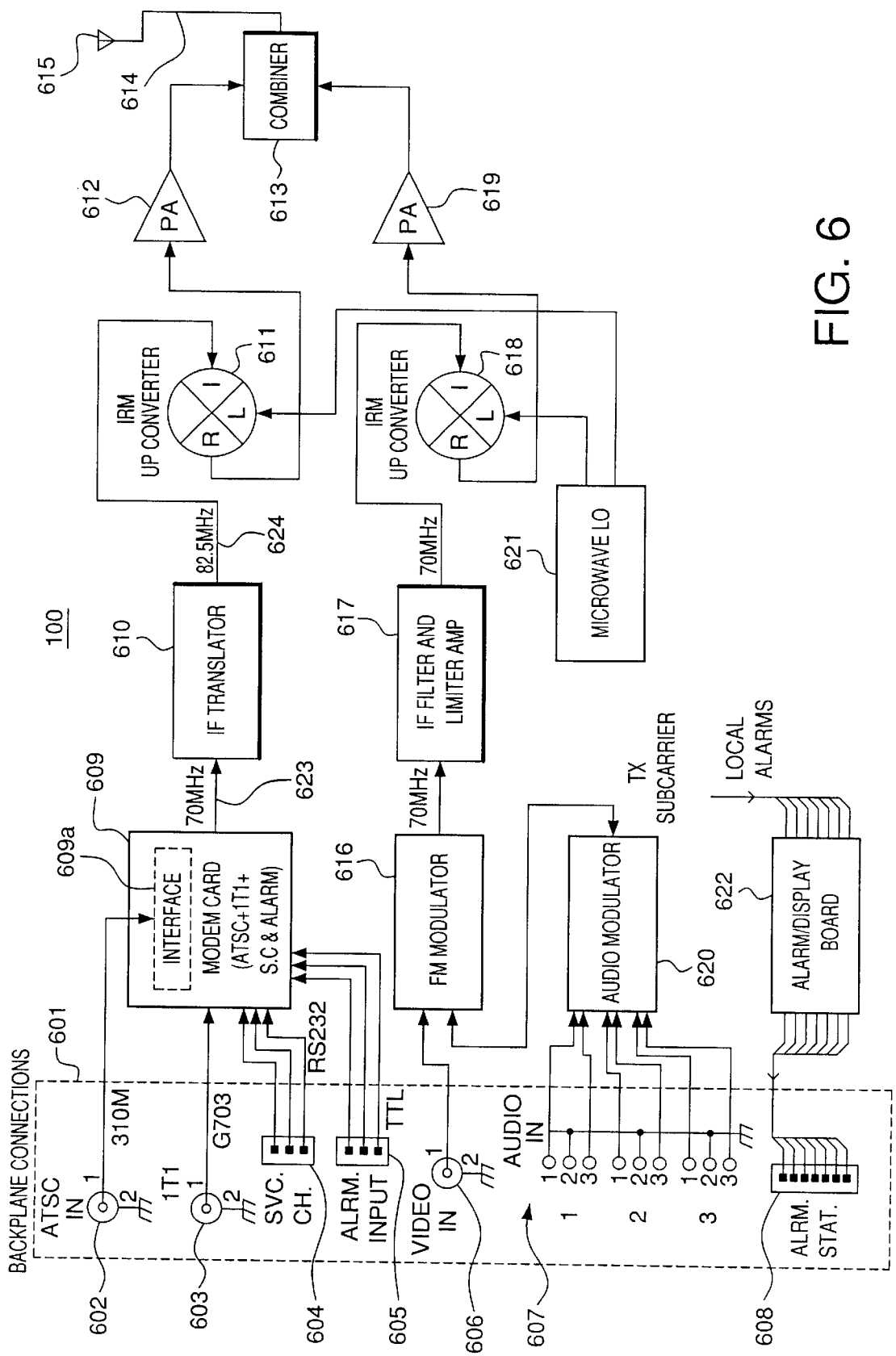
FIG. 6 is an exemplary block diagram of the transmitter shown in FIG. 1.

FIG. 6 is an exemplary block diagram of transmitter 100. The block diagram shown in FIG. 6 is only one example of components for implementing a transmitter consistent with the present invention, and other types of components and configurations are possible for implementations consistent with the present invention. Transmitter 100 receives analog and digital information signals and processes them for transmission within a particular bandwidth or channel. A backplane 601 in transmitter 100 includes terminals for receiving analog and digital information signals. A terminal 602 receives an optional ATSC signal, one type of digital information signal. Typically, that signal may include an HDTV signal having data plus a clock signal; alternatively, it may include an SDTV signal. A terminal 603 includes an optional T1 (1T1) connection and receives a data stream from the T1 connection. A T1 connection, known in the art, is a dedicated line used, for example, by private networks and for providing a high-speed link to and from an Internet service provider. Such a data stream may be used, for example, by a broadcast studio for particular management functions relating to the transmitter. A terminal 604 is a service channel and receives signals on a standard RS-232 communication link; RS-232 is a known standard for serial transmission of information between computers and peripheral devices. A terminal 605 is an alarm input that monitors conditions external to the transmitter and provides a binary signal indicating an alarm or no alarm. For example, the alarms may indicate particular environmental conditions such as a temperature too high for optimum operation of the transmitter, or the alarms may implement a burglar alarm, indicating a breach of security related to the transmitter.

A terminal 606 receives an analog information signal, typically an NTSC analog video signal. Terminals 607 receive an audio signal corresponding to the video signal received at terminal 606 and optionally receive other audio signals as well. The three audio signals at terminals 607 each include three terminals, a ground connection and a balanced input connection. An alarm status terminal 608 receives signals indicating alarms internal to the transmitter to implement, for example, what is known as a "hot standby" feature, involving use of redundant transmitters and receivers. In operation using hot standby, if a transmitter or receiver fails, as detected by an internal alarm, the radio automatically switches over to the standby transmitter or receiver to continue operating and avoid a loss of the corresponding signal.

The following components combine and process received digital information signals. A modem card 609 receives digital information signals from terminals 602–605. It includes an interface 609a which conditions the digital information signal to generate a common output; for example, it extracts the data from the digital information signal and converts it to a transistor transistor logic (TTL) signal, and it inputs the clock signal to modem care 609 to synchronize frames of the digital information signal. Modem card 609 combines all signals from terminals 602–606 into one signal using a multiplexing function, and it modulates the combined signal to a 70 megahertz intermediate (IF) frequency, an industry standard for television signals. Therefore, the output of modem card 609 is one data stream centered at 70 megahertz, signal 623. Modem card 609 uses quadrature amplitude modulation (QAM), a known technique, to generate the modulated signal. An IF translator 610 receives 70 megahertz signal 623 and shifts it to a corresponding signal 624 centered at 82.5 megahertz. The functions of IF translator 610 are further explained below.

An image reject mixer (IRM) up converter 611 receives the signal from IF translator 610 and converts it to an RF frequency. Up converter 611 is controlled by a microwave local oscillator 621, which provides the carrier signal for modulation. Up converter 611 includes an "I" (IF) terminal for receiving the 82.5 megahertz IF signal from module 610, an "L" terminal for receiving the local oscillator signal from microwave local oscillator 621, and an "R" (RF) terminal at which it outputs a corresponding up converted RF signal. Microwave local oscillators are known in the art and examples include those devices manufactured by Microlambda, Inc. Microwave local oscillator 621 typically includes a variable local oscillator signal for varying the up conversion frequency. The RF signal output from up converter 611 is transmitted through a power amplifier (PA) 612, which provides a particular amount of gain, 30 dB in this example. Power amplifiers are known in the art and examples include devices manufactured by Aydin and Fujitsu.

A power combiner 613 receives the modulated and processed digital information signal output from power amplifier 612 and combines it with a processed analog information signal. A power combiner is a resistive network used to add together signals, typically implemented by using a power splitter and reversing the connections for the input and output signals. Power splitters are known components for receiving one signal and dividing it into two signals having the same frequency response as the input signal but usually reduced in amplitude. Therefore, by reversing the connections the power splitter functions as a power combiner, receiving two signals and adding them together.

A waveguide 614 receives the output of power combiner 613 and transmit it to an antenna 615 for RF transmission as an electromagnetic signal.

The following components process and provide analog information signals to power combiner 613. An FM modulator 616 receives an analog information signal from terminal 606, receives three audio subcarriers from an audio modulator 620, and modulates those four signals into one carrier centered at 70 megahertz. Audio modulator 620 receives the three audio signals in baseband from terminals 607 and modulates each audio input signal onto a separate subcarrier. In this example, audio modulator 620 modulates audio signals onto subcarriers centered at 6.2 megahertz, 6.8 megahertz, and 7.5 megahertz. Therefore, FM modulator 616 outputs a 70 megahertz IF signal for the received analog information signals.

An IF filter and limiter amp 617 includes a standard bandpass filter, which band limits the IF spectrum of the 70 megahertz signal to fit, in this example, within a standard RF transmission channel. Therefore, it outputs a signal centered at 70 megahertz and having a 15 megahertz bandwidth for this example. The amplification function of filter 617 attempts to provide 10 dB of gain in order to amplitude limit the signal and produce an FM output signal. Bandpass filters having varying transfer characteristics may be used to filter the signal if different channel bandwidths are used.

The output of filter 617 is transmitted to an up converter 618, which typically functions in a similar manner as up converter 611. Up converter 618 receives the 70 megahertz analog information signal from filter 617 and, using a carrier signal received from microwave local oscillator 621, converts the signal to an RF frequency. Up converter 618 outputs the modulated signal to a power amplifier 619, which typically functions in a similar manner as power amplifier 612, providing a particular amount of gain, 30 dB in this example. Examples of components for implementing power amplifiers are provided above. Up converters 611 and 618 may be implemented with mixers, which are known in the art.

The output of power amplifier 619 provides the analog information portion for combination with the digital information portion by power combiner 613. Accordingly, if the analog and digital information signals include, respectively, an NTSC analog television signal and an HDTV signal, the output of power combiner 613 would typically resemble the spectrum shown in FIG. 4, each signal having its own carrier signal, having been shifted by the mixers to an RF channel frequency, and having been added together by power combiner 613. The position of the analog and digital information signals within the channel may be reversed such that the digital information signal is at the lower frequency portion of the spectrum. Although transmitter 100 is shown as first separately modulating the input analog and digital information signals to an RF frequency and then combining the modulated signals, it may alternatively first combine the signals and then up convert the combination to an RF or other transmission frequency.

An alarm display board 622 receives the local internal alarms and transmits them via a ribbon cable to an LCD display. The LCD display may be located on or proximate the transmitter for indicating and displaying the internal alarms.

Figure 7:
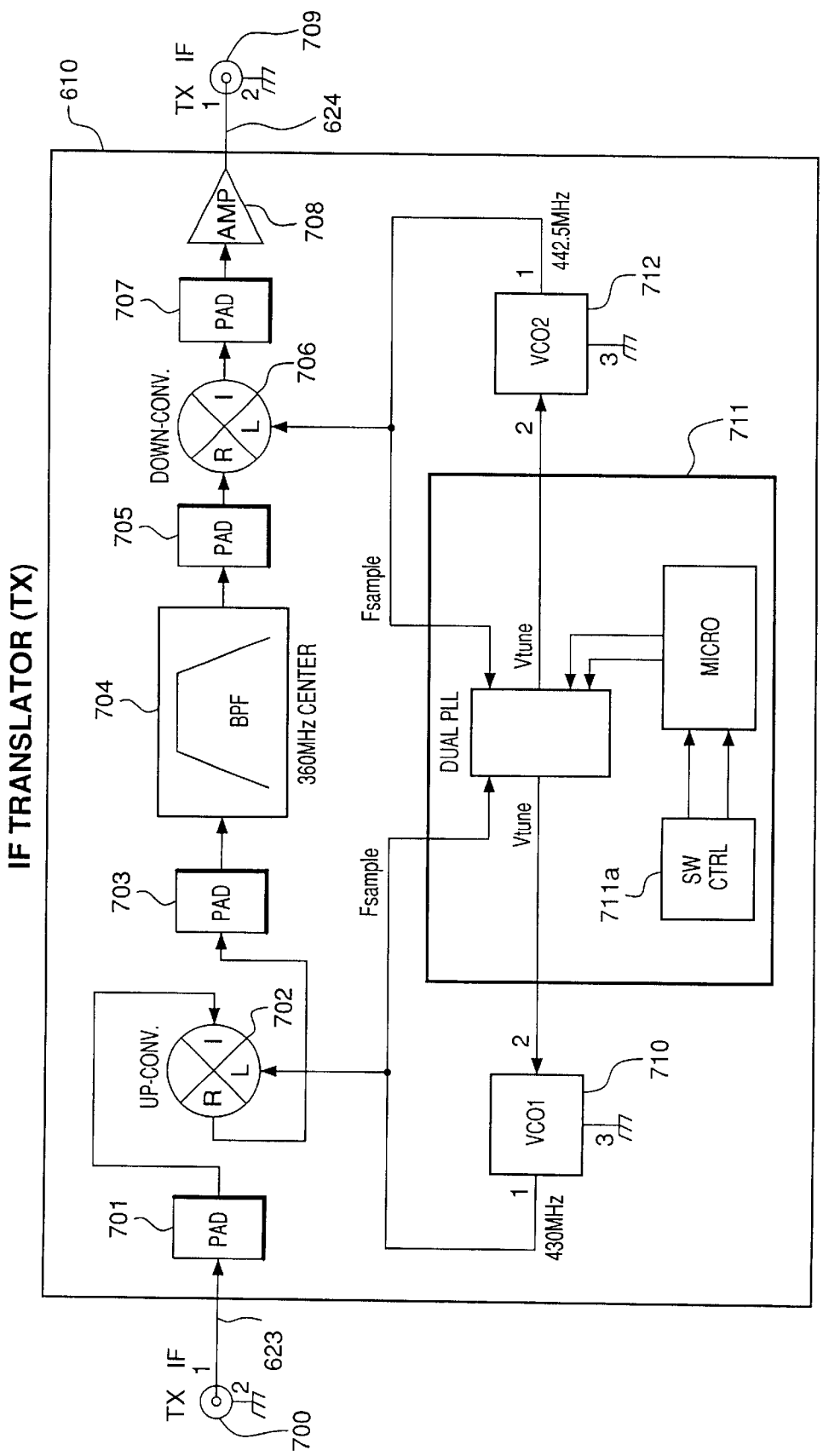
FIG. 7 is an exemplary block diagram of an IF translator shown in FIG. 6.
Figure 8:
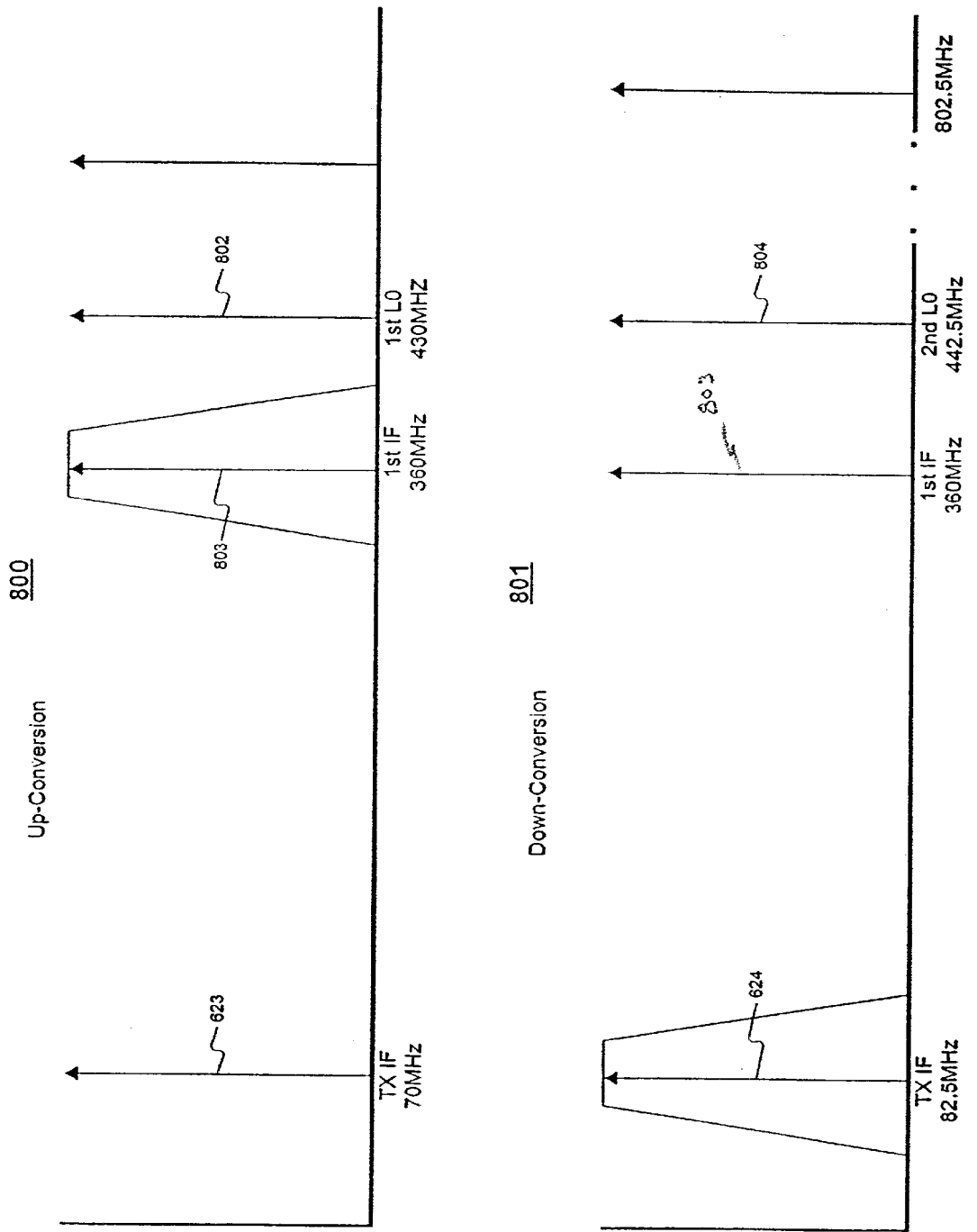
FIG. 8 is a frequency diagram of signals within the IF translator shown in FIG. 7.

FIG. 7 is a block diagram of IF translator 610 in transmitter 100. IF translator 610 functions to convert signal 623 centered at 70 megahertz to signal 624 centered at 82.5 megahertz. Because these two signals are close in frequency, a simple conversion from 70 megahertz to 82.5 megahertz would result in interference from harmonics produced during the conversion. Therefore, IF translator 610 performs an up conversion in order to isolate the signal and subsequently performs a down conversion in order to shift the signal back to 82.5 megahertz. This process is further explained with respect to FIG. 8 illustrating frequency spectrum diagrams of signals within IF translator 610.

IF translator 610 receives signal 623 at terminal 700, and transmits it through a pad 701 to an up converter 702. Pad 701, as well as other pads 703, 705, and 707 within IF translator 610, are implemented with resistive elements to ensure matching of resistance between components to optimize performance of the circuit. An up converter 702 receives signal 623 and mixes it with a local oscillator signal received from a voltage controlled oscillator 710. In this example, signal 623 is mixed with a 430 megahertz IF signal, the result of which is shown in graph 800 (FIG. 8).

Mixing signal 623 with the local oscillator signal produces a carrier signal 802 centered at 430 megahertz and also produces the sum and difference of the signals. The difference of the signals is a side band produced at 360 megahertz, as shown by signal 803. A bandpass filter 704 receives the 430 megahertz carrier signal along with the resulting side bands, and the filter is centered at 360 megahertz to extract signal 803 and reject the other signals. Bandpass filter 704 may be implemented, for example, with a filter manufactured by Toko.

A down converter 706 receives the output of band pass filter 704 and mixes it with a local oscillator in order to down convert the signal to an 82.5 megahertz IF frequency. A voltage controlled oscillator 712 provides the local oscillator signal for down converter 706, in this example a 442.5 megahertz signal. This operation is shown in graph 801. Down converter 706 mixes the second local oscillator signal 804 with the 360 megahertz signal 803, producing the difference between the two, signal 624 centered at 82.5 megahertz. Up converter 702 and down converter 706 may be implemented with mixers, which are known in the art.

Signal 624, output from down converter 706, is transmitted through an amplifier 708 in order to compensate for loss through the circuitry and is output to terminal 709. Amplifier 708 provides sufficient amplification such that, in this example, signal 623 at input terminal 700 has an amplitude of approximately −10 dBm and signal 624 at output terminal 709 has an amplitude of approximately −3 dBm, providing for 7 dB of gain through IF translator 610.

A dual phase lock loop (PLL) 711 synchronizes and controls voltage controlled oscillators 710 and 712. It samples the outputs of voltage controlled oscillators 710 and 712 (signals Fsample) and outputs corresponding control signals (signals Vtune). PLL 711 includes a switch control 711a, such that a user's setting of the switches is converted into a signal on one line, controlling the output. Dual PLLs are known in the art and may be implemented, for example, using the National Semiconductor dual PLL part number LMX2335. IF translator 610 typically always up converts to 360 megahertz but may down convert to different frequencies, as specified by switch control 711a, in order to swap positions of the analog and digital information signals within the channel. If the signals are switched in position, microwave local oscillator 621 may be adjusted in order to ensure centering of a common transport signal within a particular channel bandwidth.

Receiver

Figure 9:
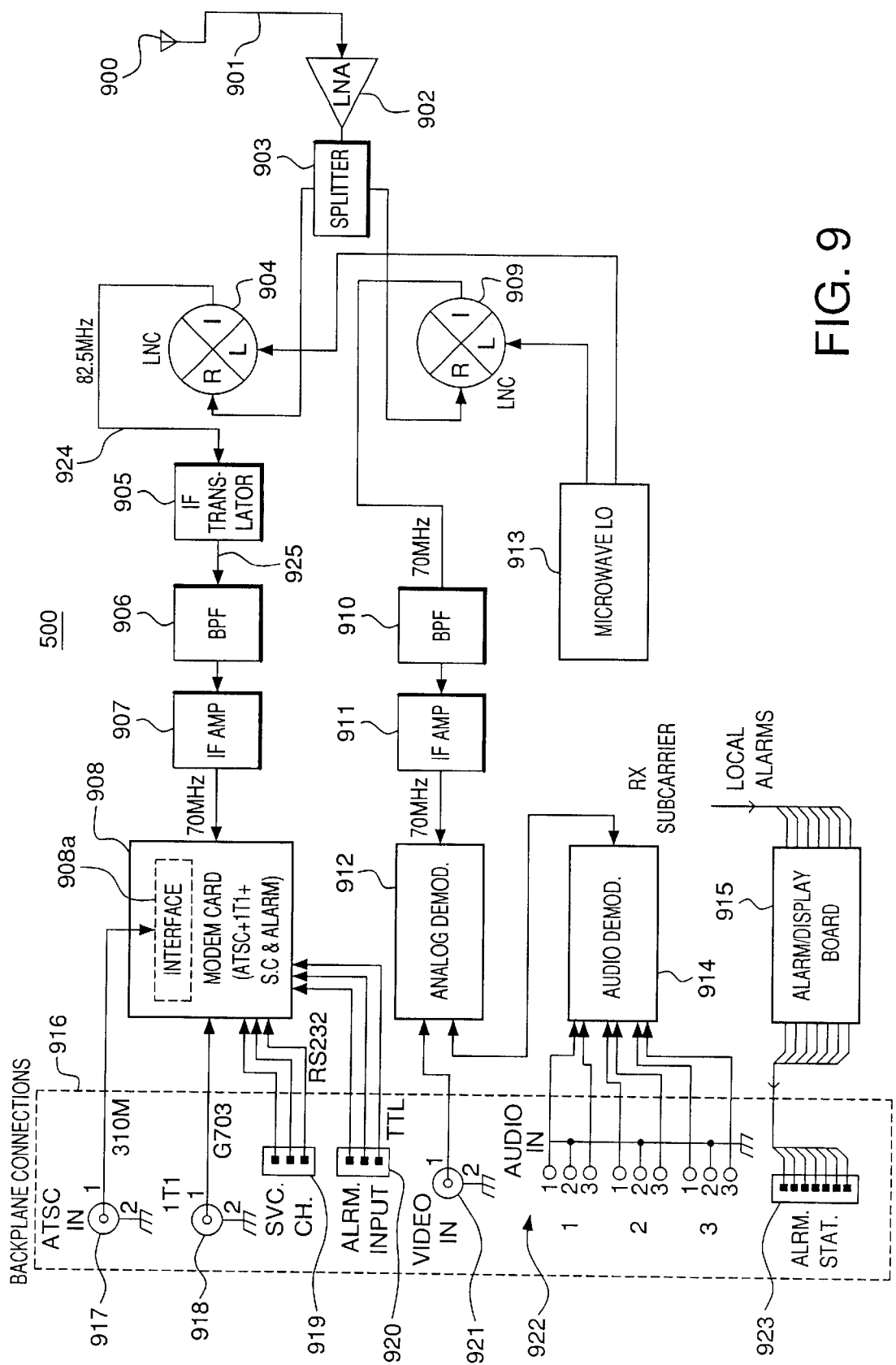
FIG. 9 is an exemplary block diagram of the receiver shown in FIG. 5.

FIG. 9 is a block diagram of receiver 500. The block diagram shown in FIG. 9 is only one example of components for implementing a receiver consistent with the present invention, and other types of components and configurations are possible for implementations consistent with the present invention. Receiver 500 receives a common transport signal at antenna 900. The common transport signal is an electromagnetic signal typically transmitted as RF signal, although it may alternatively be received from other portions of the frequency spectrum. The received signal includes a digital information signal portion and an analog information signal portion and may resemble, for example, the common transport signal shown in FIG. 4. A waveguide 901 transmits the received signal to a low noise amplifier (LNA) 902, providing gain to compensate for loss in a splitter 903; in this example, it provides 10 dB of gain. Splitter 903 is a resistive network which separates one signal into two corresponding signals; therefore, splitter 903 outputs two signals each having the same frequency spectrum as the input signal of splitter 903 but reduced in amplitude. One of the signals from splitter 903 is transmitted to a low noise converter (LNC) 904, which converts the RF signal to a signal 924 centered at 82.5 megahertz using a signal received from a microwave local oscillator 913.

An IF translator 905 receives the 82.5 megahertz signal 924 and shifts it to a corresponding signal 925 centered at 70 megahertz. The functions of IF translator 905 are further explained below.

The 70 megahertz signal 925 is transmitted through a bandpass filter 906, which may be implemented, for example, using a standard filter centered at 70 megahertz and having a 10 megahertz bandwidth to reject the analog component and isolate the digital IF signal. An IF amplifier 907 receives the isolated digital IF signal and provides an output having a constant amplitude using automatic gain control. In this example, IF amplifier 907 provides an output having a constant 5 dBm amplitude. Amplifiers having automatic gain control are known in the art. A modem card 908 receives the 70 megahertz output of amplifier 907 at a constant amplitude and demodulates the digital information signal using a 70 megahertz demodulation signal and transmits the demodulated signal to an interface 908a, which combines frames in the digital information signal with a clock signal in the corresponding signal.

Modem care 908 also separates other types of digital information signals using the 70 megahertz demodulation signal. Therefore, the demodulated signals are output to a backplane 916, including an HDTV or other such signal transmitted to an ATSC terminal 917, a data stream transmitted to a T1 connection 918, an RS-232 signal transmitted to a service channel 919, and alarm outputs transmitted to terminal 920 (including three contact closures for each alarm output). These signals correspond with the signals described with respect to backplane 601 in transmitter 100.

Figure 10:
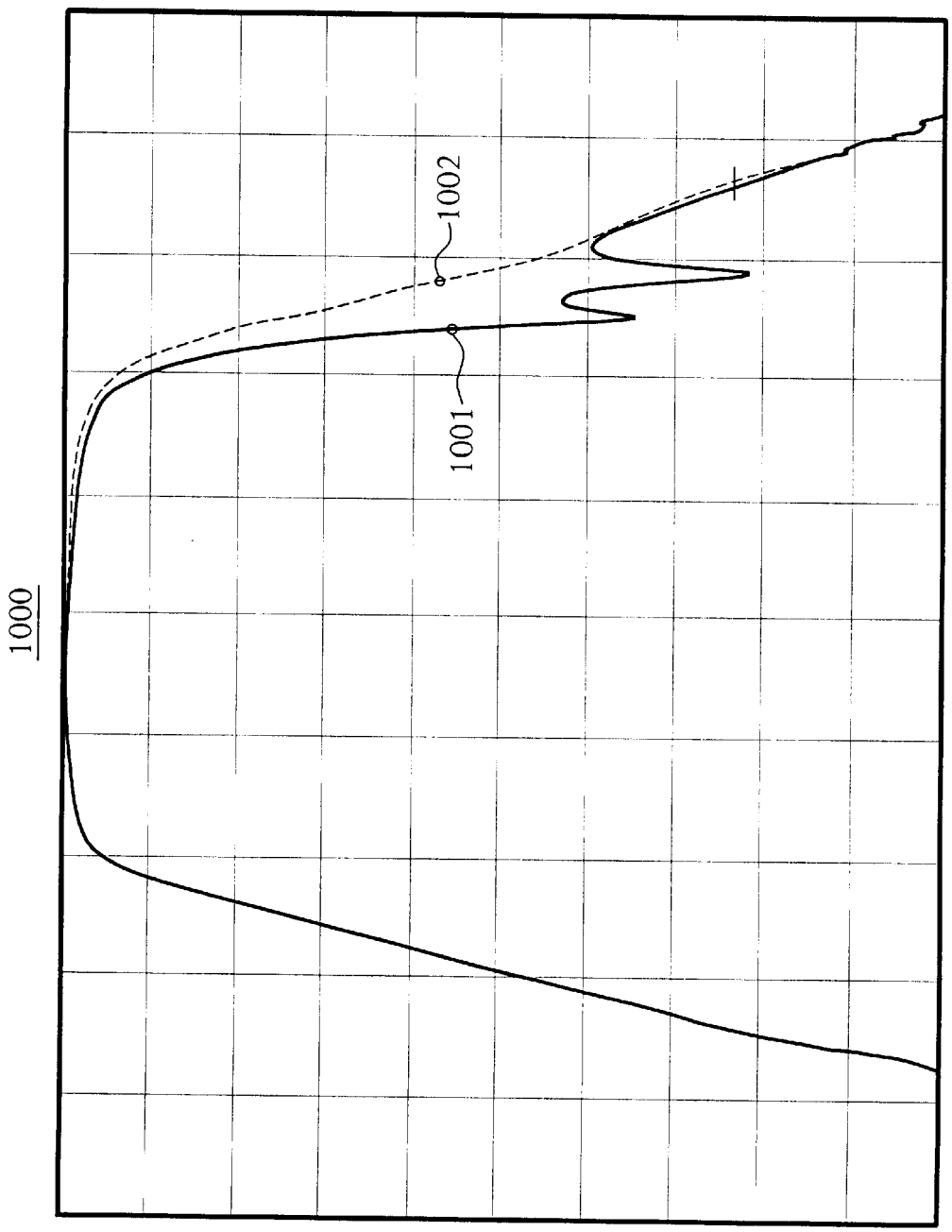
FIG. 10 is a diagram of a frequency response of a bandpass filter for filtering an analog information signal in the receiver shown in FIG. 9'

The other output from splitter 903 is transmitted to another low noise converter 909, which uses the same oscillation signal from microwave local oscillator 913 to demodulate the analog component of the signal to a 70 megahertz IF signal. LNCs 904 and 909 may be implemented with mixers in series with low noise amplifiers, all of which are known in the art as an LNC. A bandpass filter 910 receives the 70 megahertz analog signal and provides a particular type of band limiting to separate and isolate the analog IF signal from the digital information signal. In particular, it provides filtering so that the digital information signal, such as an HDTV signal, does not interfere with the analog signal. The transfer characteristic of bandpass filter 910 is shown in FIG. 10. In this example, transfer characteristic 1000 is shown with a "notch" 1001 in order to provide particular and limiting of the analog information signal. The dashed line 1002 approximates how the filter would function as a standard band pass filter without the notch. Bandpass filter 910 band limits the 70 megahertz signal by rejecting information between notch 1001 and dashed line 1002. Notch 1001 is shown on the side of the spectrum adjacent the digital information signal. If the digital and analog information signals were switched in position, the notch 1001 may be located on the other side of transfer characteristic 1000. Given a particular transfer characteristic, it is known in the art how to generate the corresponding bandpass filter. If different types of digital information signals are received, this particular band limiting may not necessarily be required, in which case a standard bandpass filter may be used. Alternatively, other types of bandpass filters having particular band limiting may be used depending upon the frequency response of the received signals.

An IF amplifier 911 receives the output of band pass filter 910 and provides an output having a constant amplitude using automatic gain control. In this example, IF amplifier 911 provides an output having a constant 5 dBm amplitude. An analog demodulator 912 receives the 70 megahertz signal at a constant amplitude and separates the analog video signal from the audio subcarriers using a 70 megahertz demodulation signal. Audio demodulator 914 receives the audio subcarrier signals from audio demodulator 912 provides demodulation at the same frequencies as modulator 620 in order to demodulate the three audio signals. Accordingly, the analog video signal is output to terminal 921 in backplane 916, and the demodulated audio signals are output to terminals 922.

An alarm display board 915 functions in the same manner as alarm display board 622 and provides alarm status signals at alarm status terminal 923, presented on an LCD display.

Figure 11:
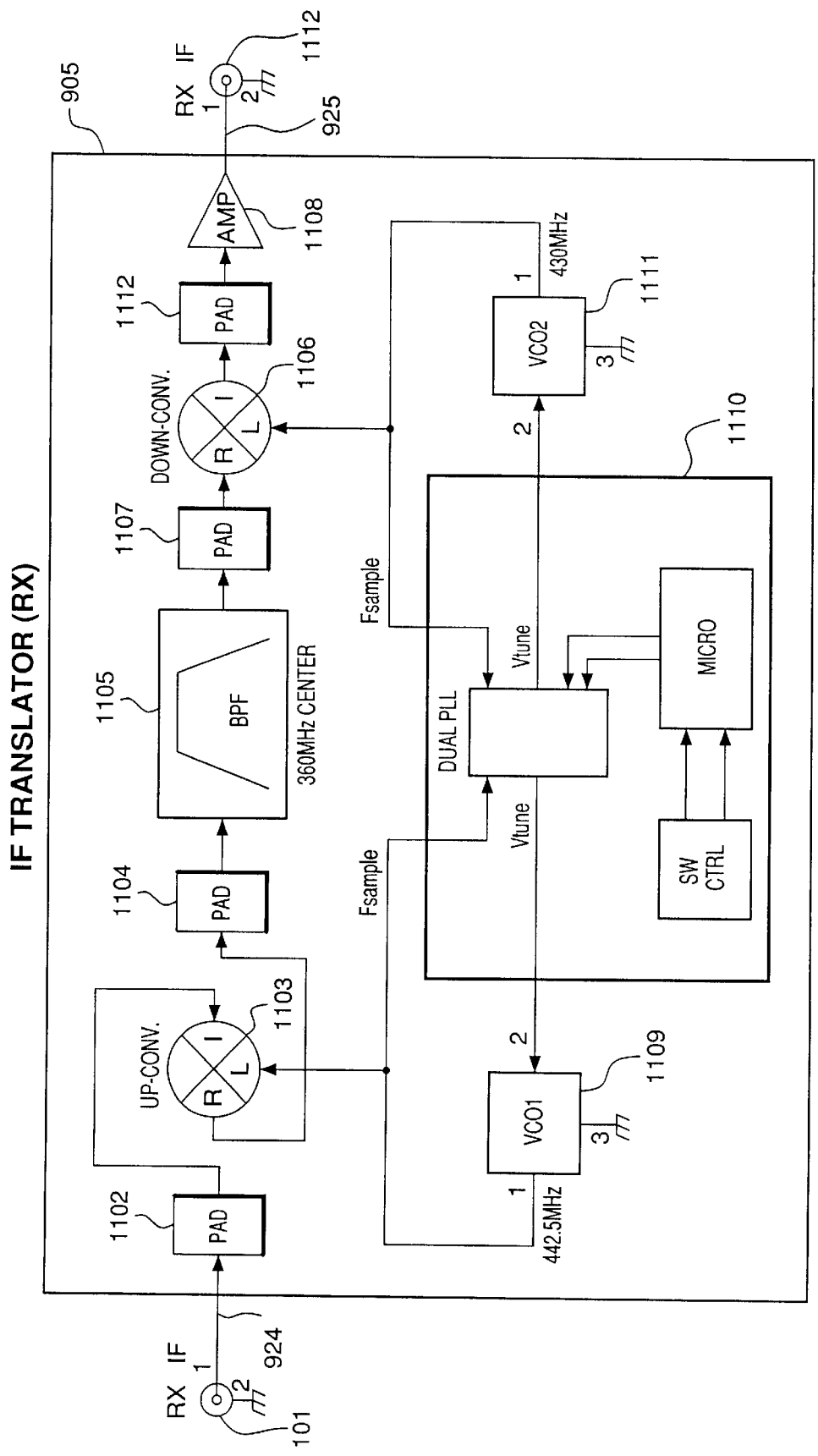
FIG. 11 is an exemplary block diagram of an IF translator shown in FIG. 9.

FIG. 11 is a block diagram of IF translator 905 in receiver 500. IF translator 905 functions in a similar manner as IF translator 610. It uses different local oscillator frequencies, however, to shift an 82.5 megahertz signal to a 70 megahertz signal using an up conversion and down conversion, as further illustrated by the signal frequency diagrams in FIG. 12. At terminal 1101, IF translator 905 receives signal 924 at 82.5 megahertz. An up converter 1103 receives the 82.5 megahertz signal from pad 1102 and mixes it with a 442.5 megahertz local oscillator frequency received from a voltage controlled oscillator 1109. Pad 1102, as well as other pads 1104, 1107, and 1112 within IF translator 905, are implemented with resistive elements to ensure matching of resistance between the components to optimize performance of the circuit.

Figure 12:
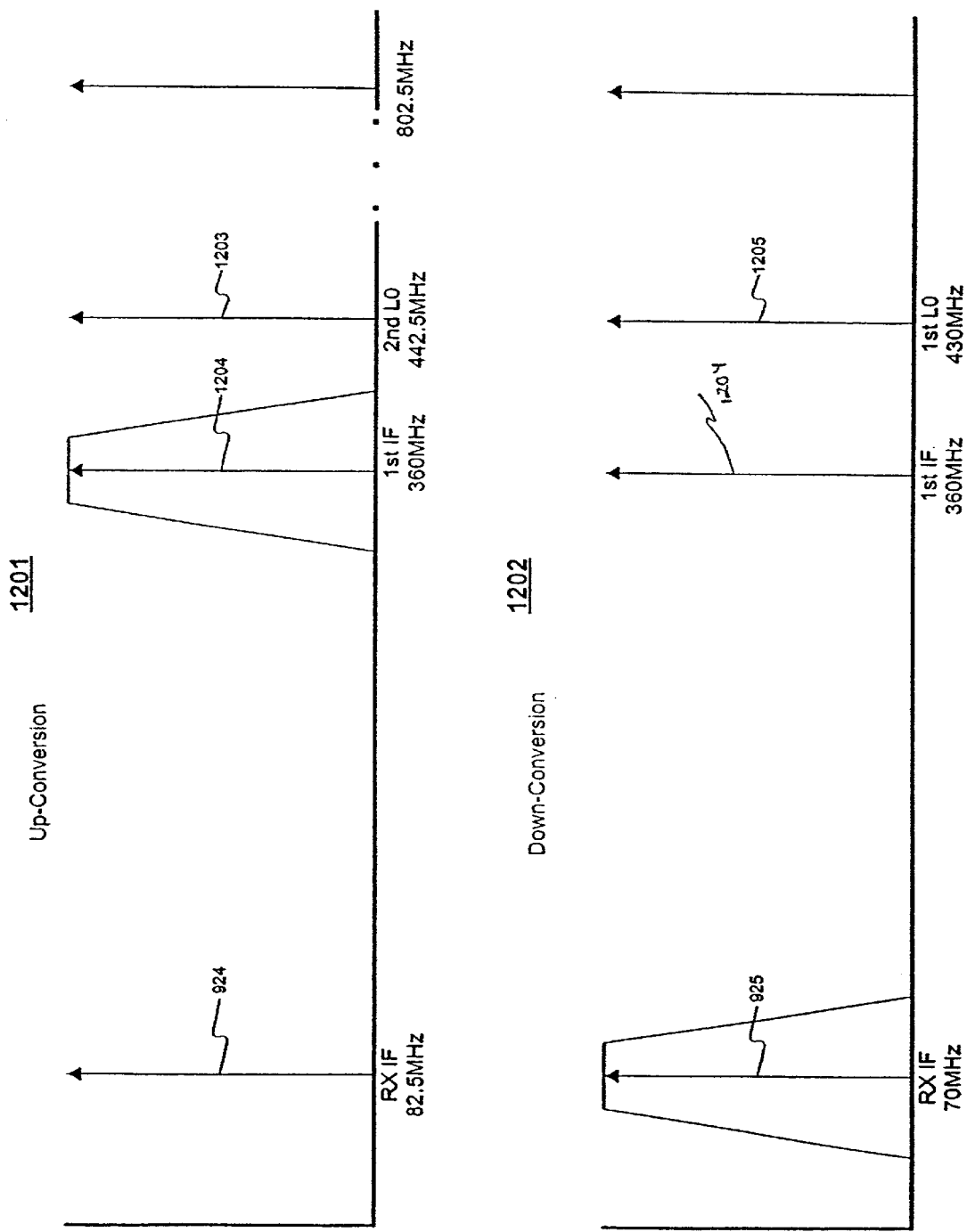
FIG. 12 is a frequency diagram of signals within the IF translator shown in FIG. 9.

Diagram 1201 in FIG. 12 illustrates the output of up converter 1103. Signal 924 is mixed with signal 1203 providing the sum and the difference. In particular, a side band is located at 360 megahertz as illustrated by signal 1204, representing the difference between signals 924 and 1203. The output of up converter 1103 is transmitted through a bandpass filter 1105 centered at 360 megahertz in order to isolate signal 1204 and reject other signals. A down converter 1106 receives the 360 megahertz signal and mixes it with a 430 megahertz local oscillator signal 1205 received from a voltage controlled oscillator 1111. This down conversion is further illustrated in diagram 1202. When signal 1204 is mixed with a 430 megahertz local oscillator frequency 1205, both the sum and the difference are produced, and the difference is signal 925 centered at 70 megahertz. Up converter 1103 and down converter 1106 may be implemented with mixers, which are known in the art.

The signal from down converter 1106 is transmitted through pad 1112 to an amplifier 1108 providing amplification to compensate for loss within IF translator 905 and is output as signal 925 to terminal 1112. In particular, amplifier 1108 provides sufficient amplification such that, in this example, signal 924 at input terminal 1101 has an amplitude of approximately −10 dBm and signal 925 at output terminal 1112 has an amplitude of approximately −3 dBm, providing for 7 dB of gain through IF translator 905. Voltage control oscillators 1109 and 1111 are controlled by a dual PLL 1110, which operates in a similar manner, and may be implemented with the exemplary component, as described with respect to dual PLL 711.

While the present invention has been described in connection with an exemplary embodiment, it will be understood that many modifications will be readily apparent to those skilled in the art, and this application is intended to cover any adaptations or variations thereof. For example, different types of components, different types of signals, varying amounts of modulation and amplification, and various hardware embodiments for the signal processing may be used without departing from the scope of the invention. This invention should be limited only by the claims and equivalents thereof.

What is claimed is:

1. A system for providing a common transport signal comprising an analog information signal and a digital information signal, said system comprising:
   means for transmitting said common transport signal;
   means for receiving said common transport signal;
   wherein said means for transmitting frequency translates, and co-locatively adds, in a single contiguous bandwidth, said single contiguous bandwidth being nominally a 25 MHz bandwidth, said analog information signal, in analog form, and said digital information signal, to form said common transport signal.

2. A system for providing a common transport signal comprising an analog information signal and a digital information signal, said system comprising:
   means for transmitting said common transport signal comprising:
      an analog information signal modulator that modulates said analog signal onto a first intermediate frequency;
      a digital information signal modulator that frequency translates said digital signal to a second intermediate frequency, said second intermediate frequency being nominally 82.5 MHz;
      a first upconverter that upconverts and amplifies said modulated analog information signal;
      a second upconverter that upconverts and amplifies said frequency translated digital information signal;
      a power combiner for adding said upconverted, modulated analog information signal and said upconverted, frequency translated digital information signal to form said common transport signal; and
      at least one transmitting antenna that transmits said common transport signal;
   means for receiving said common transport signal;
   wherein said means for transmitting frequency translates, and co-locatively adds, in a single contiguous bandwidth, said analog information signal, in analog form, and said digital information signal, to form said common transport signal.

3. A system for providing a common transport signal comprising an analog information signal and a digital information signal, said system comprising:
   means for transmitting said common transport signal;
   means for receiving said common transport signal comprising:
      a signal receptor that receives and conditions said common transport signal;
      a signal splitter that splits said common transport signal, wherein said signal receptor conditions said common transport signal for splitting by said signal splitter;
      dual downconverters that each receive said split common transport signal, wherein a first downconverter downconverts said analog information signal, and wherein a second downconverter downconverts said digital information signal;

dual bandpass filtering and intermediate frequency amplifying stages, wherein a first of said dual bandpass filtering and intermediate frequency amplifying stages filters and amplifies said analog information signal, and wherein a second of said dual bandpass filtering and intermediate frequency amplifying stages filters and amplifies said digital information signal; and dual signal demodulators, wherein a first of said dual signal demodulators demodulates said analog information signal, and wherein a second of said dual signal demodulators demodulates said digital information signal;

wherein said means for transmitting frequency translates, and co-locatively adds, in a single contiguous bandwidth, said analog information signal, in analog form, and said digital information signal, to form said common transport signal.

4. The system according to claim 3, wherein said signal receptor comprises:

at least one receiving antenna that receives said common transport signal; and at least one low noise amplifier that conditions said common transport signal.

5. The system according to claim 3, wherein said signal splitter comprises a power splitter.

6. The system according to claim 3, wherein said first downconverter recovers a first intermediate frequency comprising a modulation of said analog information signal, and wherein said second downconverter recovers a second intermediate frequency comprising a frequency translation of said digital information signal, and further comprising:

a frequency translator that translates said recovered second intermediate frequency to said standard intermediate frequency.

7. The system according to claim 6, wherein said recovered first intermediate frequency comprises a standard intermediate frequency.

8. The system of claim 7, wherein said standard intermediate frequency is nominally 70 MHz.

9. A system for providing a common transport signal comprising an analog information signal and a digital information signal, said system comprising:

a transmitter for transmitting said common transport signal;

a receiver for receiving said common transport signal, said receiver comprising:

a signal receptor that receives and conditions said common transport signal;

a signal splitter that splits said common transport signal, wherein said signal receptor conditions said common transport signal for splitting by said signal splitter;

dual downconverters that each receive said split common transport signal, wherein a first downconverter downconverts said analog information signal, and wherein a second downconverter downconverts said digital information signal;

dual bandpass filtering and intermediate frequency amplifying stages, wherein a first of said dual bandpass filtering and intermediate frequency amplifying stages filters and amplifies said analog information signal, and wherein a second of said dual bandpass filtering and intermediate frequency amplifying stages filters and amplifies said digital information signal; and dual signal demodulators, wherein a first of said dual signal demodulators demodulates said analog information signal, and wherein a second of said dual signal demodulators demodulates said digital information signal;

wherein said transmitter frequency translates, and co-locatively adds, in a single contiguous bandwidth, said analog information signal, in analog form, and said digital information signal, to form said common transport signal.

10. The system according to claim 9, wherein said signal receptor comprises:

at least one receiving antenna that receives said common transport signal; and at least one low noise amplifier that conditions said common transport signal.

* * * * *